United States Patent
Um (10) Patent No.: US 9,207,802 B2
(45) Date of Patent: Dec. 8, 2015

(54) SUPPRESSION OF UNINTENDED TOUCH OBJECTS

(71) Applicant: Joo Yong Um, Gunpo-si (KR)

(72) Inventor: Joo Yong Um, Gunpo-si (KR)

(73) Assignee: Atmel Korea LLC, Seoul (KR)

(*) Notice: Subject to any disclaimer, the term of this patent is extended or adjusted under 35 U.S.C. 154(b) by 227 days.

(21) Appl. No.: 13/932,767

(22) Filed: Jul. 1, 2013

(65) Prior Publication Data

US 2015/0002451 A1   Jan. 1, 2015

(51) Int. Cl.
*G06F 3/045* (2006.01)
*G06F 3/041* (2006.01)
*G06F 3/044* (2006.01)

(52) U.S. Cl.
CPC ............... *G06F 3/0416* (2013.01); *G06F 3/044* (2013.01)

(58) Field of Classification Search
CPC .......... G06F 3/03545; G06F 3/048883; G06F 3/0317
USPC ...................... 345/173–179; 178/18.01–18.04
See application file for complete search history.

(56) References Cited

U.S. PATENT DOCUMENTS

| | | | |
|---|---|---|---|
| 7,663,607 B2 | 2/2010 | Hotelling | |
| 7,698,524 B2 * | 4/2010 | Lee et al. | 711/167 |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2004/0041798 A1 * | 3/2004 | Kim | 345/179 |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Kimnhung Nguyen
(74) *Attorney, Agent, or Firm* — Baker Botts L.L.P.

(57) ABSTRACT

An apparatus includes a touch sensor operable to sense objects that touch the touch sensor. The apparatus also includes a touch sensor controller operable to detect a first object and determine that the first object is an object that a user intends to touch the touch sensor. The touch sensor controller also defines an intended touch area associated with the first object and suppresses detection of touches that are outside of the defined intended touch area.

20 Claims, 4 Drawing Sheets

SUPPRESSION OF UNINTENDED TOUCH OBJECTS

TECHNICAL FIELD

This disclosure relates generally to touch screen technology.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

For a more complete understanding of the present disclosure and its advantages, reference is now made to the following description, taken in conjunction with the accompanying drawings, in which.

DESCRIPTION OF EXAMPLE EMBODIMENTS

In particular embodiments of the present disclosure, a touch sensor and touch sensor controller may be capable of suppressing detection of objects that unintentionally touch the touch sensor. Example embodiments of a touch sensor and touch-sensor controller are herein described. In particular embodiments, touch-sensor controller may be capable of detecting intended touch objects such as a stylus or human finger. During user activities such as handwriting or drawing, a user may desire to rest her hand on the touch screen for better stabilization and control. Because capacitive touch sensors may be capable of detecting all capacitive objects in contact with the touch sensor, however, a touch sensor may detect the user's hand even though the user does not intend for the hand to be used as an input to the touch sensor device. This problem can be exacerbated as a result of the user's movements during handwriting because movements made during handwriting may be particularly prone to causing undesired inputs that are similar to the inputs caused by a stylus or writing finger. For example, moving the hand across the touch screen during handwriting may cause parts of the fingers or knuckles to intermittently tap or come into near contact with the touch screen, which may cause false inputs to the touch screen controller due to the similarity of those inputs to the writing utensil in size, shape, and/or signal strength.

Utilizing the teachings of the present disclosure, however, such problems may be overcome and/or eliminated. For example, a touch-sensor controller is disclosed that may detect user activities such as handwriting and initiate an area suppression mode during such user activities. In area suppression mode, the touch screen controller may detect touch objects in the vicinity of the intended writing utensil while suppressing detection of touch objects outside the detectable area. The location of the detectable area may be updated to track the movements of the intended touch object. False inputs that may be caused during handwriting may typically occur outside the detectable area. Thus, problems and inefficiencies due to false inputs during user activities such as handwriting may be eliminated. A more detailed description of example embodiments of a touch sensor and stylus, including technical advantages of various embodiments, are described below with respect to FIGS. 1 to 6.

Figure 1:
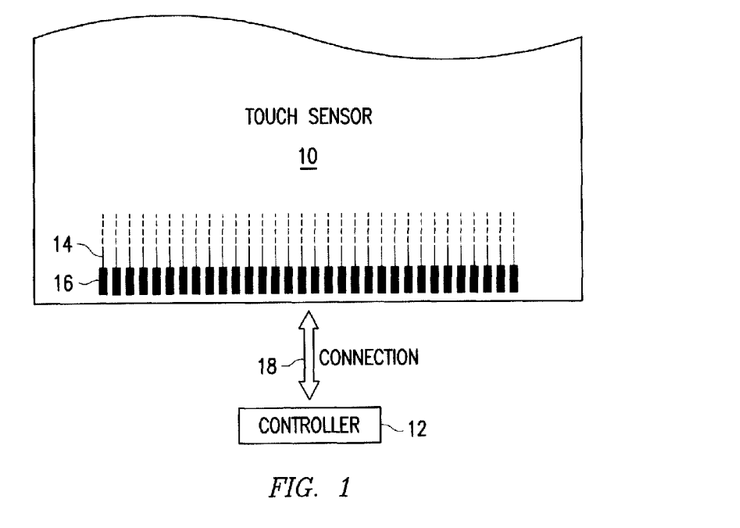
FIG. 1 illustrates an example touch sensor.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, in particular embodiments. Similarly, reference to a touch-sensor controller may encompass both the touch-sensor controller and its touch sensor, in particular embodiments. Touch sensor 10 may include one or more touch-sensitive areas, in particular embodiments. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, in particular embodiments. Alternatively, in particular embodiments, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), in particular embodiments. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the line lines of conductive material may occupy approximately 5% of the area of its shape in a hatched, mesh, or other suitable pattern. Herein, reference to FLM encompasses such material, in particular embodiments. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

In particular embodiments, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, in particular embodiments, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, in particular embodiments.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, in particular embodiments. Similarly, reference to a sense line may encompass one or more sense electrodes making up the sense line, and vice versa, in particular embodiments.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, in particular embodiments. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, in particular embodiments. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
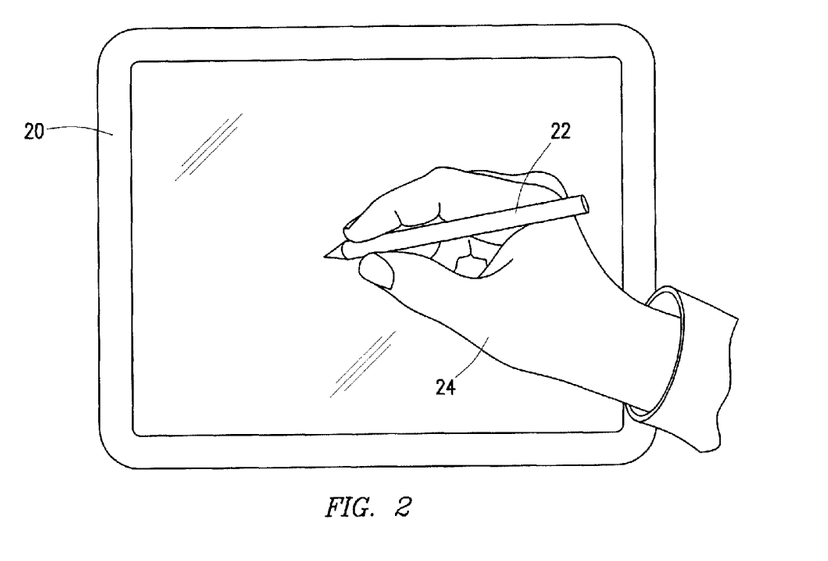
FIG. 2 illustrates an example stylus with touch sensor device.

FIG. 2 illustrates an example stylus with touch sensor device 20. Touch sensor device 20 may include an embodiment of touch sensor 10 and touch-sensor controller 12 that is similar to or the same as the embodiments described above with respect to FIG. 1. In various embodiments, touch sensor 10 may interact with a touch object such as a stylus 22 in any suitable manner. A particular stylus 22 may be configured to cause a change in capacitance at a capacitive node of touch sensor 10. The change in capacitance induced by stylus 22 may mimic a touch by, for example, a human finger. Accordingly, when the processor causes the drive unit to supply drive signals to the one or more of the drive electrodes, stylus 22 may detect the pulse and respond by injecting a charge at a capacitive node in proximity to the stylus. The touch-sensor controller 12 may measure the change in capacitance to detect and/or track the location of stylus 22 as it is moved by a human appendage 24.

In a particular implementation of touch sensor 10, touch-sensor controller 12 may successively control pulses on horizontal drive lines such that a given horizontal drive line may pulse at a given time. Stylus 22 may be an active stylus or passive stylus. Active Stylus 22 may detect the edge of the pulse on the given horizontal drive line and may determine an amplitude of the pulse induced in a tip of the active stylus 22. In response, active stylus 22 may transmit a high voltage pulse on its stylus tip. Active Stylus 22 may modulate the amplitude of the pulse based on the amplitude of the pulse induced in the active stylus tip by the given horizontal drive line. The pulse transmitted by the active stylus tip may reduce the effective charge of capacitive nodes in proximity to active stylus 22. Touch-sensor controller 12 may detect the resulting effective charge on the vertical sense lines, and by coordinating the known location of the horizontal drive line pulse with the effective charge on the vertical sense lines, determine a location of active stylus 22.

Modulation of the pulse transmitted by stylus 22 may be detected by touch-sensor controller 12 to facilitate determining the location of stylus 22. For example, if stylus 22 is moving in a direction parallel with the vertical sense lines, a modulated signal responsive to the amplitude of the drive line signal detected by stylus 22 may allow the touch-screen controller 12 to determine stylus 22's relative vertical distance from a given horizontal drive line. Modulating the signal output by stylus 22 may increase the accuracy of the touch-sensor controller 12. In order to accomplish this, stylus 22 may include a detection circuit that detects the amplitude of drive line pulses and modulates the pulse output on its stylus tip responsive to the amplitude of the detected drive line pulse.

It should be noted that while a particular embodiment of touch sensor device 20 is illustrated, the teachings of the present disclosure apply to any number and types of touch-sensitive devices, such as tablet PCs, personal digital assistants (PDAs), mobile telephones, and other personal computing devices.

As illustrated in FIG. 2, when a user interacts with touch sensor device 20 (for example, by writing or drawing on touch sensor device 20), the user's hand, wrist, palm, and/or fingers 24 may be in close proximity to or in contact with the surface of the touch sensor device 20. This contact or close proximity may be interpreted as a touch on the screen by touch-sensor controller 12. These touches, however, may not be intended by the user to result in touches to the screen of touch sensor device 20. Instead, the user may intend for touch sensor device 20 to interpret touches made by stylus 22 (or a particular one or more of the user's fingers) and not unintended touches made by the users' hand, wrist, palm, and/or other fingers 24.

Figure 3:
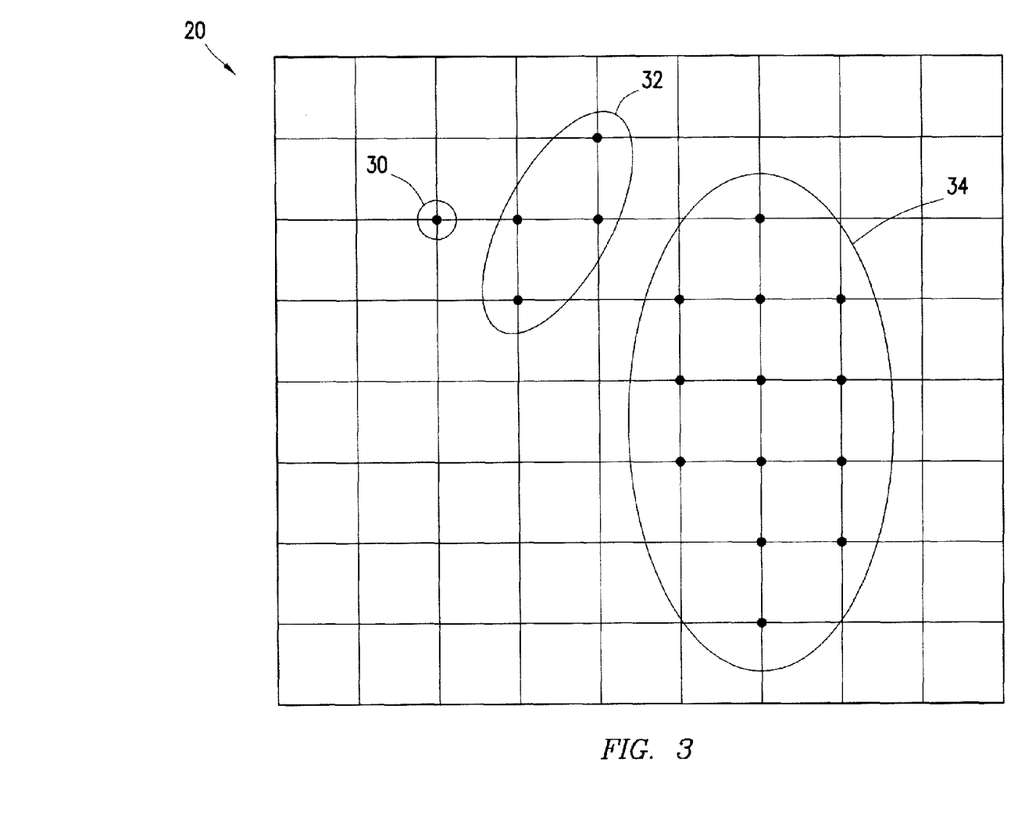
FIG. 3 illustrates an example pattern of touch objects that may be detected by a touch sensor device.

FIG. 3 illustrates an example pattern of touch objects 30, 32, and 34 that may be detected by a touch sensor device 20 as a user interacts with touch sensor device 20 using, for example, stylus 22. Several touch objects 30, 32, and 34 are detected in the illustrated embodiment. The illustrated touch objects roughly correspond to a touch pattern that may be caused in response to the user interaction shown in FIG. 2. As shown, parts of the user's palm, wrist, and hand 24 may contact the screen along with the tip of stylus 22 forming touch objects 30, 32, and 34. As illustrated, touch object 30 represents a touch made by stylus 22, while touch objects 32 and 34 are formed by respective portions of the user's hand, palm, and/or wrist. Typically, touch objects 32 and 34 may not be intended to be inputs to touch screen device 20, particularly during activities such as handwriting or drawing. Accordingly, various embodiments of touch-screen controller 12 may be capable of detecting object 30 while suppressing objects 32 and 34 during such activities.

A capacitive touch screen of an example touch screen device 20 may include a grid of electrodes arranged such that a touch can be detected at each of a plurality of nodes formed by capacitive couplings between the electrodes. Touch screen device 20 may be supported by appropriate electronics to determine the location of various touches, such as touch objects 30, 32, and 34. However, while a particular arrangement of electrodes is shown, any appropriate arrangement may be used, including but not limited to those described above with respect to FIG. 1.

In FIG. 3, the black circles indicate that an object has touched that node or that group of nodes. Such objects may be detected by, for example, a change in capacitance of that node. Various objects that touch the screen may cause more than one node to indicate a touch. For example, a single touch by a finger may cause one or more nodes to change state and indicate a touch. The spacing of nodes in particular embodiments may affect how many nodes are triggered by a particularly sized and shaped touch object.

Touch-sensor controller 12 may be capable of grouping detections at various nodes into touch objects that correspond to the physical object that touched touch sensor 10. Touch-sensor controller 12 may determine touch objects in any appropriate manner. Touch-sensor controller 12 may group detections into touch objects based on the number of adjacent touch detections. In some embodiments, touch-sensor controller 12 may utilize pattern recognition to determine touch objects. For example, touch-sensor controller 12 may compare a detected pattern of touches to one or more predetermined patterns, which may be stored in memory, to determine whether the detected patterns match any known touch objects. These patterns may be based on various factors that may be measured at the touch sensor 10. For example, a touch object may be determined based on a touch size, a touch shape, and a signal strength. In some embodiments, a pattern may be defined by a combination of such factors. Stylus 22 may, for example, have a particular touch size, a particular touch shape, and may have a particular signal strength. When a touch object is detected that matches the predetermined pattern of stylus 22, touch-sensor controller 12 may determine that the object is stylus 22. A palm or fist may have a different touch size, touch shape, and signal strength. Touch-sensor controller 12 may likewise determine other touch objects, such as hands, wrists, fingers, or palms 24.

Touch objects may be classified by touch-sensor controller 12 into intended touches and unintended touches based at least in part on the type of touch object that is detected. For example, if touch object 30 is determined to be stylus 22, touch-sensor controller 12 may determine that touch object 30 is an intended touch object. Based in part on determining that the touch object 30 stylus 22 and/or an intended touch object, touch-sensor controller 12 may determine that other objects in contact with the touch screen are unintended. Additionally or alternatively, some types of touches may be determined to be intended or unintended touches regardless of whether stylus 22 is present. Touch-sensor controller 12 may determine that an object of a particularly large size is an unintended touch object (which may correspond, for example, to the size of a human palm or wrist). For example, touch-sensor controller 12 may determine that a touch object is greater than a predetermined size, which may correspond to the size of stylus 22. Based on determining that the touch object fits a particular pattern and/or is greater than a predetermined size, touch-sensor controller 12 may determine that the object is an unintended touch object and/or to suppress detection of the object.

Touch-sensor controller 12 may suppress unintended touch objects in various ways as appropriate. For example, touch-sensor controller 12 may, after determining that touch objects 32 and 34 are unintended touch objects, decide not to report the detection of such objects to other portions of touch screen device 20, such as a higher level subsystem, display unit, or processor. Thus, higher level subsystems, processors, or display units of touch screen device 20 may not be informed that a touch by unintended touch objects 32 and 34 occurred, instead only being informed of intended touch objects such as touch objects 30. Accordingly, the touch screen device 20 may react appropriately to intended touch objects while ignoring unintended touch objects. This may prevent unintended touch responses, such as a palm touch or wrist touch causing the cursor on a display screen to move in an undesired or unexpected manner. Another example of a manner in which touch-sensor controller 12 may suppress unintended touch objects is explained below with respect to FIGS. 4-6.

Figure 4:
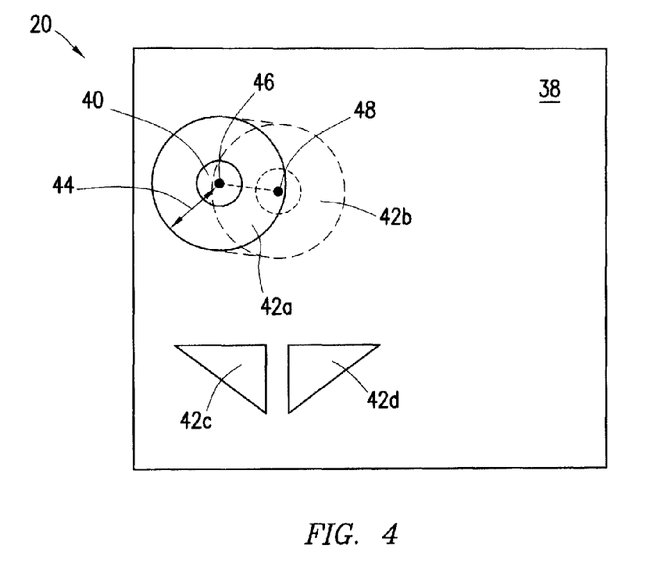
FIG. 4 illustrates a touch sensor device with unintended touch suppression capabilities.

FIG. 4 illustrates a touch sensor device 20 with unintended touch suppression capabilities. As noted above, touch-sensor controller 12 may detect unintended touches based in part on the pattern of that touch object. Touch-sensor controller 12 may differentiate between intended touches by, for example, stylus 22 and a human wrist, palm, or hand 24. Some unintended touch patterns, however, may closely resemble the same pattern as caused by stylus 22. For example, because stylus 22 may be designed to mimic a touch by a human finger, a stray touch or tap by a portion of a human hand or finger might cause a touch-sensor controller 12 to misidentify an unintended touch as an intended touch by stylus 22. Touch-sensor controller 12 may overcome such technical difficulties by suppressing the detection of touch objects that occur in area 38 outside of an area 42 associated with a detected intended touch object 40.

Touch-sensor controller 12 may determine that touch object 40 is an intended touch object in any suitable manner. Touch-sensor controller 12 may determine that touch object 40 is, for example, stylus 22 or a human finger based on its pattern. Touch screen controller may, in addition to or alternatively to the manners described above, identify that a touch object is an intended touch object based in part on a gesture and/or movement pattern of touch object 40. For example, touch-sensor controller 12 may determine that touch object 40 is being moved across the screen in a consistent and/or continuous manner. Such movements may indicate that the user is in the process of writing or drawing. The determination of a gesture and/or movement consistent with writing or drawing may, in some embodiments, trigger touch-sensor controller 12 to initiate an area suppression mode, in which touch-sensor controller 12 may suppress the detection of touch objects in the area 38 outside the vicinity of the touch object 40. When not in area suppression mode, touch-sensor controller 12 may operate in a normal mode, in which objects may be detected in a manner as described above with respect to FIGS. 1-3.

After determining that touch object 40 is an intended touch object, touch-sensor controller 12 may initiate suppression of objects outside the vicinity of touch object 40. In some embodiments, touch-sensor controller 12 may define an area 42 surrounding touch object 40. Area 42 may be an area in the vicinity of touch object 40 in which touch screen controller 12 continues to monitor for intended touch objects. Touch screen controller may suppress detection of touch objects in area 38 outside of area 42.

Area 42 may be defined in any suitable manner. For example, area 42 may be defined as a circle having a radius 44 that extends a predetermined distance from the location of touch object 40. It should be noted, however, that the teachings of the present invention are not limited to areas 42 that have any particular shapes or geometries. Accordingly, area 42 may be defined according to any appropriate shape, geometry, size, and/or metric. For example, while illustrated as a circle, area 42 may also form a triangular shape in an inscribed circle as shown by areas 42c and 42d. Such shapes may be beneficial for adaptive suppression, such as areas 42d for right-handed users or areas 42c for left-handed users. In some embodiments, such areas 42 may be set via a user setting at touch-sensor controller 12.

In some embodiments, the size and/or shape of area 42 may be adjusted in response to a change in user setting. For example, the length of radius 44 may be an adjustable user setting. Touch-sensor controller 12 may provide an interface to higher level subsystems or the processor of touch screen device 20 from which a user setting may be provided as an input to the touch sensor controller 12. Touch screen device 20 may provide an interface on a display that allows a user to change settings associated with area 42. In some embodiments, the settings may be made available through a context-sensitive menu. The user may be allowed to change various parameters controlling the size and/or shape of area 42. For example, the user may be able to set the length of radius 44. As another example, the user may be able to change the rate at which area 42 is updated. In some embodiments, however, some, none, or all parameters associated with area 42 may be hardcoded and/or set by a manufacturer before touch screen device 20 is sold to the user.

Once area 42 is set, touch-sensor controller 12 may suppress the detection of touch objects in area 38 outside of area 42. As noted above, touch-sensor controller 12 may simply not report the detection of objects in area 38 to higher level subsystems of touch screen device 20. Additionally or alternatively, touch-sensor controller 12 may only active drive lines and/or measure on sense lines that pass through area 42. Touch-sensor controller 12 may thus detect touch objects that are within area 42.

As a user makes gestures, writes, or draws on touch sensor device 20, the location of stylus 22 and/or other intended touch object 40 may move within area 42. For example, touch object 40 may move from location 46 to a new location 48. Touch-sensor controller 12 may detect and/or update the location of touch object 40 as it moves. Touch-sensor controller 12 may also adjust the location of defined area 42a in accordance with the movement of touch object 40. For example, touch-sensor controller 12 may redefine and/or update area 42a to be new area 42b indicated by the dashed circle in the illustrated embodiment. In some embodiments, touch-sensor controller 12 may update the location of area 42 continuously and/or on predetermined intervals as touch object 40 moves. Touch-sensor controller 12 may update the location of area 42 when a detected touch object 40 is within a predetermined distance to the edge of area 42a. Additionally or alternatively, touch-sensor controller 12 may update the location of area 42 each time that touch object 40 is detected as moved and/or per some set number of times that touch object 40 is detected. In some embodiments, touch-sensor controller 12 may be able to adaptively configure the rate at which area 42 is updated and/or redefined based on factors such as the speed or rate of movement of touch object 40. Accordingly, the location of area 42 may be updated in such a way that it tracks the movement of touch object 40.

Touch-sensor controller 12 may be capable of remaining in area suppression mode while touches continue to be detected within areas 42. Touch-sensor controller 12 may be capable of setting a timeout period upon each detection of touch object 40 within area 42. Once a predetermined period of time is lapsed since the last detection of touch object 40 within area 42, touch-sensor controller 12 may transition to normal mode of operation in which touch objects 40 are detected within area 38 and areas 42. Touch-sensor controller 12 may discontinue suppressing detection of touch objects in area 38. If, however, a touch object 40 is detected within area 42 before the predetermined amount of time occurs, touch-sensor controller 12 may reset the timeout period. The predetermined timeout period may be timed such that the timeout may be set to lapse before the completion of particular writing activities that may involve removing active stylus 22 from contact with touch sensor 10 and moving active stylus 22 to another location of touch sensor 10. For example, a user may remove active stylus 22 to dot "i's" and cross "t's," or may move active stylus 22 to another portion of touch sensor 10 to begin another word, line, or paragraph. Additionally or alternatively, the geometry of area 42 may be designed to take into account such activities. Area 42 may, for example, be a rectangle or square that is large enough to capture such activities within the detectable area.

Figure 5:
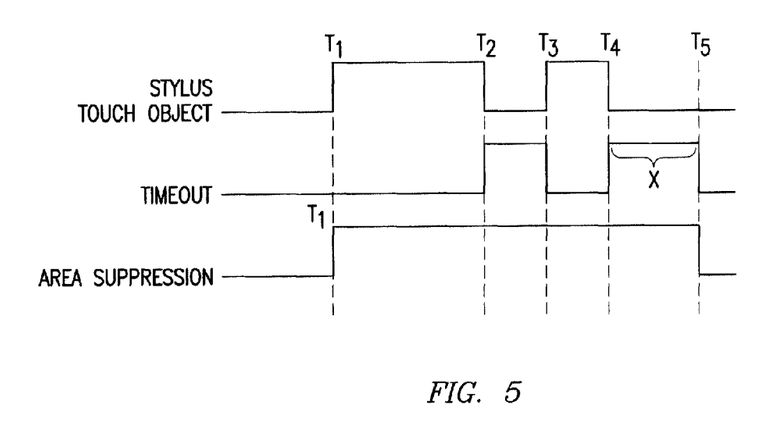
FIG. 5 illustrates an example timing diagram for a touch sensor device with unintended touch suppression capabilities.

FIG. 5 illustrates an example timing diagram for a touch sensor device 29 with unintended touch suppression capabilities. At time T1, an intended touch object 40 such as stylus 22 is detected. Touch-sensor controller 12 may then initiate an area suppression mode. As described above, touch-sensor controller 12 may suppress the detection of touch objects that are located outside of an area 42 in the vicinity of touch object 40. While touch object 40 remains in the vicinity of or touching touch sensor 10, touch-sensor controller 12 may continue to update the location of touch object 40 and adjust the location of area 42. At time T2, touch object 40 may no longer be detected within area 42. As a result, touch-sensor controller 12 may initiate a timing circuit or timer. At time T3, touch object 40 may be detected again within area 42. This may be the result of short time periods in which stylus 22 or other intended touch object 40 being lifted away from touch sensor 10. For example, stylus 22 may be lifted temporarily away from touch sensor 10 when the user makes particular writing strokes. At time T4, touch object 40 may again be no longer detected within area 42. If a predetermined time X occurs before touch object 40 is detected, then at time T5, touch-sensor controller 12 may exit from area suppression mode.

Figure 6:
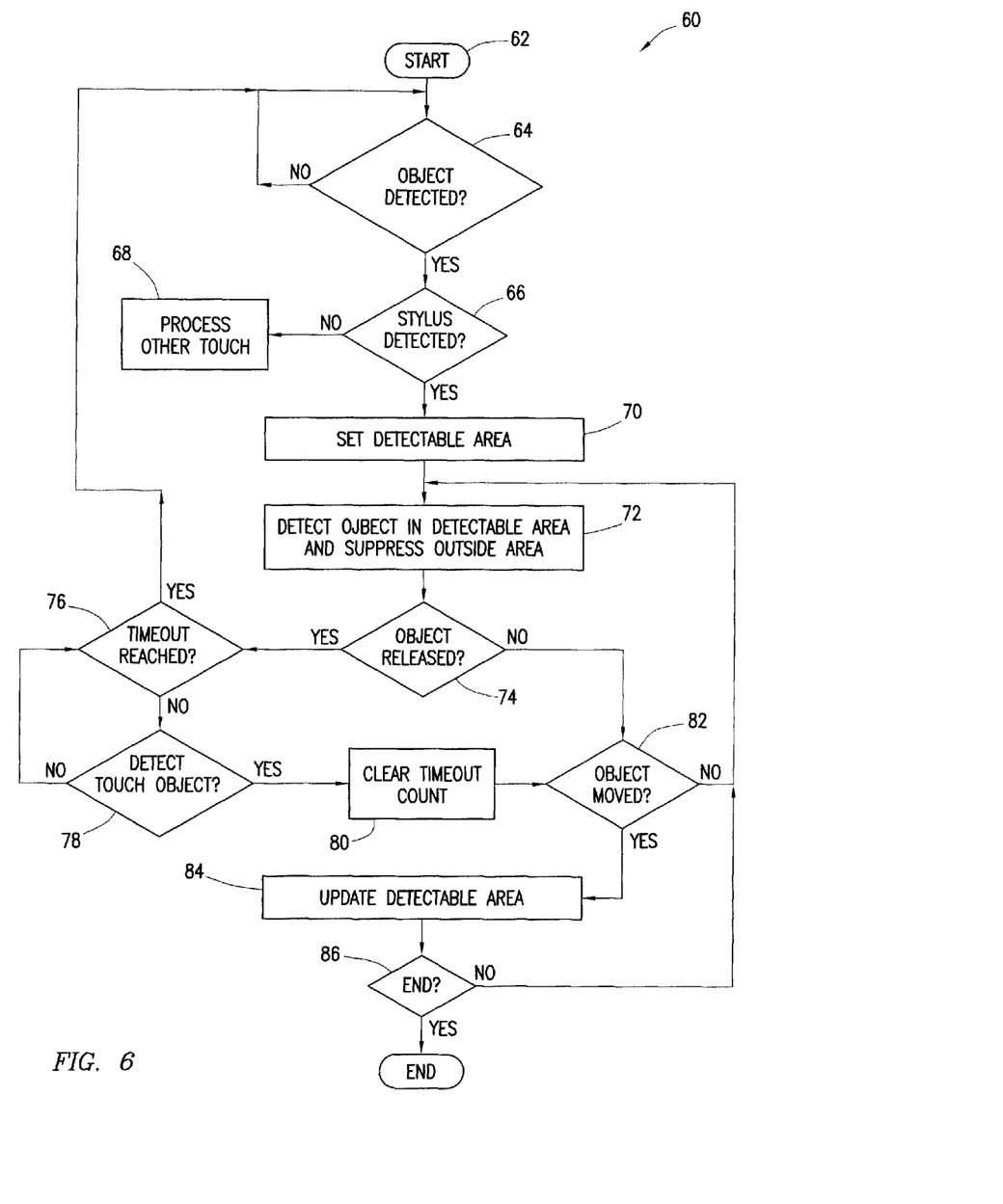
FIG. 6 is a flowchart illustrating an example method for operating a touch sensor device.

FIG. 6 is a flowchart illustrating an example method 60 for operating a touch sensor device 20. Method 60 begins at step 62, at which time touch sensor 20 may be powered on and any initialization steps are performed. At step 64, touch-sensor controller 12 determines whether a touch object is detected.

If a touch object is detected, the method continues to step 66, where touch-sensor controller 12 determines whether the detected object (or objects) is an intended touch object. This may include, as shown in the illustrated embodiment, determining that the detected object is a stylus 22 or other intended touch object. As noted above, the determination may be based on any number of factors, including the size, shape, and signal strength of the detected object. The determination may, in some embodiments, also be based on detected user gestures, behaviors, or movements. For example, particular movements may be associated with writing or drawing activities. If touch-sensor controller 12 detects that the object is an intended touch object and/or that the user is engaging in the appropriate activities, touch-sensor controller 12 may initiate suppression of unintended touch objects at step 70. If touch-sensor controller 12, however, determines that the object is not an intended touch object 40 and/or that the user is not engaged in the appropriate activities, the method 60 may proceed to step 68. Step 68 may include using other detection techniques and/or continuing to operate in normal mode. For example, touch-sensor controller 12 may determine to process the touch object and/or to suppress the object using various other techniques described herein.

At step 70, touch-sensor controller 12 may initiate suppression of unintended touch objects by setting the detectable area 42. Touch-sensor controller 12 may set the detectable area 42 and the suppression area 38 in a similar manner as is described above with respect to FIG. 4. At step 72, touch-sensor controller 12 may detect touch objects that are detected within detectable area 42 and suppress objects that are detected outside of detectable area 42.

At step 74, touch-sensor controller 12 may determine whether the touch object in detectable area 42 is released and/or no longer in contact with touch sensor 10. If the object is still in contact with touch sensor 10 within detectable area 42, touch-sensor controller 12 may at step 82 determine whether the touch object is moved. If the object is released and/or no longer in contact with touch sensor 10, touch-sensor controller 12 may continue to step 76, in which a timing circuit may be initiated. If at step 78 an object is not detected within the timeout period, method 60 may proceed back to step 64 in which touch-sensor controller 12 may transition to normal detection mode in which objects may be detected within a larger area or the entirety of touch sensor 10. Touch-sensor controller 12 may discontinue suppressing detection of touch objects that are outside of area 42.

If at step 78 an object is detected within area 42 before the timeout period lapses, the method will clear the timeout counter at step 80 and continue to step 82. If at step 82, the touch object has moved, the method proceeds to step 84. At step 84, touch-sensor controller 12 may detect and/or update the location of the intended touch object within detectable area 42. In some embodiments, touch-sensor controller 12 may update the location of detectable area 42 as touch object is moved within detectable area 42.

At step 86, a determination is made whether to end the method or continue detecting touch objects in detectable area at step 72. Method 60 may end, for example, if the touch sensor device 20 is powered down and/or enters a power-saving mode.

Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Certain embodiments of the present disclosure present various technical advantages. One technical advantage includes the ability to suppress unintended touch objects. As a result of the ability to suppress unintended touch objects, unwanted or accidental inputs to touch sensor 10 may be detected and/or suppressed. Accordingly, a technical advantage may include an improved user experience in which touch sensor 10 is more responsive to correct inputs and does not respond to erroneous inputs. Another technical advantage may include the ability to suppress unintended touch objects that are highly similar in pattern to intended touch objects, such as a stray finger or unwanted tap on the display screen. Another technical advantage may include the ability to suppress areas of touch sensor 10 during particular user activities, such as drawing and/or writing. By not merely relying on differences in signal patterns, touch sensor 10 may substantially eliminate unintended touches, including during such user activities. It should be noted that certain embodiments of the present disclosure may include all, some, or none of these technical advantages. Other advantages of the present disclosure will be readily apparent to one of ordinary skill in the art.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, in particular embodiments. A computer-readable non-transitory storage medium or media may be volatile, non-volatile, or a combination of volatile and non-volatile, in particular embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, an intended touch object may be a stylus or a human appendage such as a finger. As another example, the stylus need not be an active stylus. The present disclosure is intended to encompass all manner of touch objects, including an active and/or passive stylus. Moreover, while the disclosure is discussed in terms of detecting one intended touch object, it should be understood that the teachings of the present disclosure are applicable to systems capable of detecting multiple intended touch objects at once and/or in parallel. Furthermore, touch-sensor controller 12 of the present disclosure may be capable of supporting multiple different modes and/or types of unintended touch suppression.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
a touch sensor operable to sense a plurality of objects that touch the touch sensor, said touch sensor comprising a plurality of electrodes to be disposed on at least one substrate;
a touch sensor controller operable to:
detect a first object touching the touch sensor;
determine that the first object is an object that a user intends to touch the touch sensor;
define an intended touch area associated with the first object, the intended touch area comprising an area covering a portion of the plurality of electrodes; and
suppress detection of touches of the touch sensor that are outside of the defined intended touch area.

2. The apparatus of claim 1, wherein the touch sensor controller is further operable to:
detect that the first object is moved from a first location to a second location within the intended touch area; and
adjust a location of the defined area based on the detected movement of the first object.

3. The apparatus of claim 1, wherein the intended touch area is defined by a radius having a predetermined length extending from a location of the first object.

4. The apparatus of claim 3, wherein the predetermined length is an adjustable user setting.

5. The apparatus of claim 1, wherein the touch sensor controller determines that the first object is an object that a user intends to touch the touch sensor by determining that the first touch object is a stylus.

6. The apparatus of claim 1, wherein the touch sensor controller is further operable to initiate suppression of unintended touches based at least in part upon determining that the first object is a stylus.

7. The apparatus of claim 1, wherein the touch sensor controller determines that the first object is an object that a user intends to touch the touch sensor based at least upon one or more of a touch size, a touch pattern, and a signal strength.

8. An apparatus comprising:
a touch sensor operable to sense a plurality of objects that touch the touch sensor:
a touch sensor controller operable to:
detect a first object touching the touch sensor;
determine that the first object is an object that a user intends to touch the touch sensor;
define an intended touch area associated with the first object; and
suppress detection of touches that are outside of the defined intended touch area; and
wherein the touch sensor is further operable to:
determine that a predetermined time period since a detection of an object within the defined intended touch area is lapsed; and
discontinue suppressing detection of touches that are outside of the defined intended touch area.

9. A method comprising:
detecting a first object touching a touch sensor, said touch sensor comprising a plurality of electrodes to be disposed on at least one substrate;
determining that the first object is an object that a user intends to touch the touch sensor;
defining an intended touch area associated with the first object, the intended touch area comprising an area covering a portion of the plurality of electrodes; and suppressing detection of touches of the touch sensor that are outside of the defined intended touch area.

10. The method of claim 9, further comprising:
detecting that the first object is moved from a first location to a second location within the intended touch area; and
adjusting a location of the defined area based on the detected movement of the first object.

11. The method of claim 9, wherein the intended touch area is defined by a radius having a predetermined length extending from a location of the first object.

12. The method of claim 11, wherein the predetermined length is an adjustable user setting.

13. The method of claim 9, further comprising determining that the first object is an object that a user intends to touch the touch sensor by determining that the first object is a stylus.

14. The method of claim 9, further comprising initiating suppression of unintended touches based at least in part upon determining that the first object is a stylus.

15. A method comprising:
detecting a first object touching a touch sensor;
determining that the first object is an object that a user intends to touch the touch sensor;
defining an intended touch area associated with the first object; and
suppressing detection of touches that are outside of the defined intended touch area;
determining that a predetermined time period since a detection of a touch within the defined intended touch area is lapsed; and
discontinuing suppressing detection of touches that are outside of the defined intended touch area.

16. A system, comprising:
a computing device;
a display screen; and
a touch sensor, the touch sensor comprising:
a plurality of electrodes to be disposed on at least one substrate; and
a touch sensor controller operable to:
detect a first object touching the touch sensor;
determine that the first touch object is an object that a user intends to touch the touch sensor;
define an intended touch area associated with the first object, the intended touch area comprising an area covering a portion of the plurality of electrodes; and
suppress detection of touches of the touch sensor that are outside of the defined intended touch area.

17. The system of claim 16, wherein the touch sensor controller is further operable to:
detect that the first object is moved from a first location to a second location within the intended touch area; and
adjust a location of the defined area based on the detected movement of the first object.

18. The system of claim 16, wherein the intended touch area is defined by a radius having a predetermined length extending from a location of the first object.

19. The system of claim 16, wherein the touch sensor controller determines that the first object is an object that a user intends to touch the touch sensor by determining that the first touch object is a stylus.

20. An apparatus comprising:
a touch sensor operable to sense a plurality of objects that touch the touch sensor;
a touch sensor controller operable to:
detect a first object touching the touch sensor;
determine that the first object is an object that a user intends to touch the touch sensor;
define an intended touch area associated with the first object; and
suppress detection of touches that are outside of the defined intended touch area; and
wherein the touch sensor controller is further operable to:
determine that a predetermined time period since a detection of a touch within the defined intended touch area is lapsed; and
discontinue suppressing detection of touches that are outside of the defined intended touch area.

* * * * *